United States Patent [19]
Fitzmaurice et al.

[11] 3,937,945
[45] Feb. 10, 1976

[54] APPARATUS FOR SIMULATING OPTICAL TRANSMISSION LINKS

[75] Inventors: Michael W. Fitzmaurice, Gambrills; Mona Tycz, Greenbelt, both of Md.

[73] Assignee: The United States of America as represented by the United States National Aeronautics and Space Administration Office of General Counsel-Code GP, Washington, D.C.

[22] Filed: June 25, 1974

[21] Appl. No.: 482,953

[52] U.S. Cl.................................. 235/184; 250/199
[51] Int. Cl.² ..................... G06G 7/48; H04B 9/00
[58] Field of Search .......... 235/184, 193, 197, 181; 250/199; 332/7.51; 325/42, 43, 31, 65, 66, 67, 105, 115, 323, 363, 473

[56] References Cited
UNITED STATES PATENTS

| | | | |
|---|---|---|---|
| 3,124,678 | 3/1964 | Masonson | 235/197 |
| 3,243,592 | 3/1966 | Tomiyasu et al. | 250/199 |
| 3,714,437 | 1/1973 | Kinsel | 250/199 |
| 3,752,992 | 8/1973 | Fluhr | 250/199 |
| 3,787,118 | 1/1974 | Nowicki et al. | 332/7.51 X |

Primary Examiner—Joseph F. Ruggiero
Attorney, Agent, or Firm—Ronald F. Sandler; Nina M. Lawrence; John R. Manning

[57] ABSTRACT

A space-to-space or space-to-earth optical transmission link is simulated by positioning a linear optical modulator between an optical carrier source and a receiver for the carrier. The optical modulator is driven by an analog signal having random variations indicative of characteristics of the transmission link, as derived from an analog computer circuit. The analog computer circuit is responsive to a Gaussian random analog source. For certain types of links, the analog computer circuit is responsive to a pair of Gaussian analog signals which are derived by feeding a relatively wide band Gaussian analog source in parallel to a first low pass filter and to a heterodyne circuit that derives a beat frequency output that is passed through a second low pass filter having the same characteristics as the first low pass filter. For space-to-space transmission, transmitter pointing jitter is a dominant noise source and is simulated by deriving a beta statistical variation from the analog computer. For space-to-earth transmission, atmospheric scintillation is a dominant noise source and is simulated by driving the modulator with one of (1) a log normal, (2) Rayleigh, or (3) Ricean output of the analog computer circuit.

13 Claims, 2 Drawing Figures

APPARATUS FOR SIMULATING OPTICAL TRANSMISSION LINKS

ORIGIN OF THE INVENTION

The invention described herein was made by employees of the United States Government and may be manufactured and used by or for the Government for governmental purposes without the payment of any royalties thereon or therefor.

FIELD OF INVENTION

The present invention relates generally to an apparatus for simulating space-to-space or space-to-earth, i.e., ground, optical transmission links wherein a linear optical modulator is connected to be responsive to an analog signal derived from a Gaussian random source, wherein the analog signal has random variations simulating characteristics of the transmission link.

BACKGROUND OF THE INVENTION

There are presently programs directed toward developing high data rate, nominally 300 MBps to 1 GBps, optical communication systems for space flight use. A typical system might employ a Nd:YAG mode locked laser transmitter using on-off key (OOK), binary polarization (BPM) or pulse quaternary (PQM) modulation formats and a photoemissive direct detection receiver incorporating either high speed, gated photomultiplier tubes or avalanche photodiode-low noise, wideband amplifier combinations. Such systems are governed by Poisson statistics. The performances thereof for OOK or BPM modulation formats and deterministic average receiver signal intensity have previously been analyzed and reported in the literature.

Optical communication systems appear at present most attractive in the space-to-space link. In the space-to-space configuration, it is easiest to take full advantage of the relatively small size, power and weight of optical communication systems as well as the rugged and long lifetime components used in such systems. However, in the space-to-space configuration, as exemplified by a low earth orbiter to synchronous satellite link, the operational system may require sub-arcsecond pointing of the laser transmitter beam. As a result, a dominant noise source may be the interaction of the transmitter far field irradiance profile and the instantaneous transmitter pointing direction. Thus, the average receiver signal level may be random and obey beta statistics, as reported in the literature. For the space-to-ground link one can take advantage of the transmitter low power, light weight, etc. system parameters, but must contend with the perturbing effects of the atmosphere. Performance analysis reported in the literature for the space-to-ground link incorporate the effects of atmospheric scintillation assuming a log normal channel. Theory exists and has been reported asserting that certain space-to-ground optical communication links will also be subject to atmospheric scintillation resulting in time varying average signal amplitudes described by Ricean or Rayleigh probability distributions.

Past attempts to simulate the random variations of space-to-earth and space-to-space optical communication links have involved physically perturbating air between a source of optical radiation and a detector for the radiation. The air has generally been perturbated by heating or introducing air current turbulence. It has been found that such techniques do not provide sufficiently consistent and accurate simulation of the random variations to enable laboratory testing of the link in a desired manner.

BRIEF DESCRIPTION AND OBJECTS OF THE INVENTION

It is an object of the invention to provide new and improved apparatus for enabling random effects of a free space optical communication system to be simulated so that such systems can be tested in a laboratory environment.

Another object of the invention is to provide new and improved apparatus for simulating random effects of a space-to-earthh optical communication system, including the effects of atmospheric scintillation.

Another object of the invention is to provide new and improved apparatus for simulating random effects of a space-to-space optical communication system, including the effects of transmitter pointing jitter.

It is a further object of the present invention to provide a new and improved apparatus for simulating controlled effects of atmospheric scintillation and transmitter pointing inaccuracy of optical communication systems for testing and evaluating space-to-space and space-to-ground optical links.

The present invention utilizes a linearized optical modulator responsive to a computer driven by at least one Gaussian source. The modulator transforms a constant intensity optical signal (I) into a modulated, random optical signal ($I_M$) having a pre-selected probability distribution $f_{I_M}(i_m)$ dependent on the link to be simulated. The apparatus is designed to produce random optical signals having time varying irradiance that obeys log normal or beta statistics or a time varying E-field amplitude that obeys either of the Ricean or Rayleigh statistics. The computer is preferably of an analog type and includes elements for enabling voltage replicas of the irradiance and amplitude modulations to be applied to the optical modulator.

For the beta, Rayleigh and Ricean modulations, the Gaussian source includes first and second analog signals having a substantially zero cross-correlation coefficient. The first and second signals are preferably derived from a single analog Gaussian source having a relatively wide bandwidth. The source feeds a first low pass filter for deriving the first analog signal as a baseband signal. The second analog is also derived at baseband by heterodyning the Gaussian source and feeding a resulting beat frequency to a second low pass filter having the same cutoff frequency as the first low pass filter.

The above and still further objects, features and advantages of the present invention will become apparent upon consideration of the following detailed description of one specific embodiment thereof, especially when taken in conjunction with the accompanying drawing.

DETAILED DESCRIPTION OF THE DRAWING

Figures 1, 2:
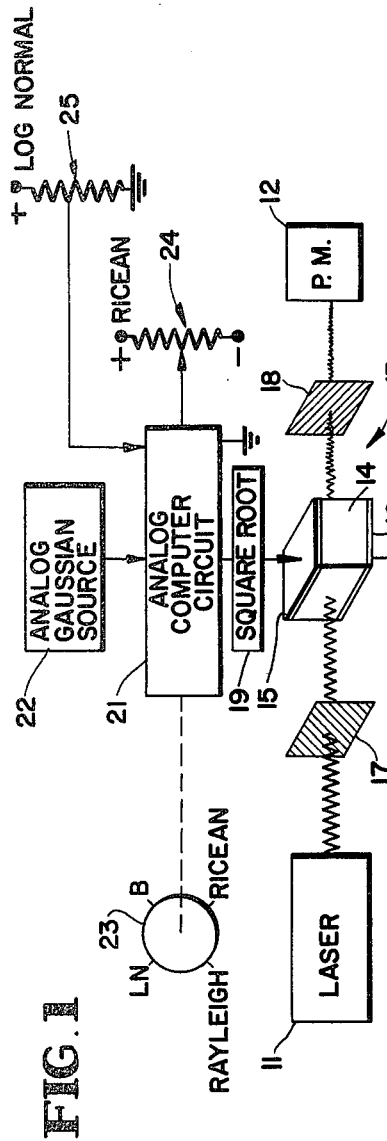
FIG. 1 is a schematic diagram of one embodiment of the invention.
FIG. 2 is a block diagram of an analog computer circuit and Gaussian source of FIG. 1.

Reference is now made to FIG. 1 of the drawing wherein there is illustrated a coherent optical carrier source 11, such as a Nd:YAG mode locked laser which illuminates an optical receiver 12, e.g., a photomultiplier, for the carrier wave of source 11, after passing through a linearized optical modulator 13. Laser source 11 and receiver 12 simulate a transmitter and receiver of a space-to-space or space-to-earth optical transmission link, such as utilized for optical communications between spacecraft or between a spacecraft and the earth. Linearized optical modulator 13 modulates the carrier source from laser 11 to simulate perturbations that are a dominant noise source in the transmission of the carrier.

For space-to-space transmission links, pointing jitter of a laser transmitter is the dominant noise source and this pointing jitter is simulated by causing the modulator to impose beta statistics on the laser beam. The beta statistics result in the optical energy incident on modulator 13 being modified to provide an output, $I_M$, in accordance with:

$$I_M = I_0 e^{-\rho^2/2\epsilon^2} \quad (1)$$

where:
$I_0$ corresponds to the peak of the spatial Gaussian irradiance profile,
$\epsilon$ is the transmitter beam half angle at the $1/e^2$ points and
$\rho$ is the distance the beam is off-axis from the center of the receiving aperture.

For typical optical transmission links, $\rho^2$ is a chi-squared random variable of two degrees of freedom corresponding to two independent and orthogonal Gaussian tracking error signals.

For space-to-earth transmission, the dominant noise source is atmospheric scintillation which is simulated by causing modulator 13 to impose either of (1) log normal, (2) Rayleigh, or (3) Ricean variations on the optical wave passing through the modulator 13. For the log normal situation, the intensity ratio is given by:

$$I_M = I_0 e^{2L} \quad (2)$$

where:
2L is Gaussian with a mean value of K and a variance, i.e., standard deviation squared ($\sigma^2$), of $\lambda^2$.

For Rayleigh or Ricean variations, the atmospheric scintillation is simulated by causing the E field amplitude, rather than irradiance, of the optical beam emerging from modulator 13 relative to the amplitude of the peak of the spatial Gaussian E field profile derived from the modulator to be represented as:

$$\frac{A_M}{A_0} = [X_1^2 + X_2^2]^{1/2} \quad (3)$$

where for the Ricean case $X_1$ and $X_2$ are independent Gaussian random variables with different mean values ($\mu_1$ and $\mu_2$) and with variances ($\sigma_1^2 = \sigma_2^2$). For the Rayleigh case, $\mu_1 = \mu_2 = 0$.

Linearized optical modulator 13 may be either the acousto-optic type or an electro-optic type. If the modulator 13 is of the acousto-optic type, it typically includes a photoelastic medium wherein the optical energy is modulated due to interaction of the energy with a sound wave in the modulator. The interaction induces diffracted light waves at a frequency equal to the sum or difference of the sound and optical waves. The cell is driven by an electric voltage which induces the acoustic wave therein. It can be shown that if the applied voltage is considerably less than the voltage which results in maximum diffraction of the light wave, the ratio of the diffracted to incident light is directly proportional to the square of the voltage applied to the cell. Thus the modulating voltage applied to the cell is applied via square root device 19. Such device may, for example, be a square root module of the type obtainable from Burr Brown, Model 9874/19. This in turn provides a linearized output from modulator 13.

When the linearized optical modulator 13 is of the electro-optic type, as illustrated in FIG. 1, it includes an electro-optical modulator crystal 14, preferably a KDP crystal, having a pair of parallel electrodes 15 and 16 which are positioned on faces of the crystal parallel to the direction of the laser beam and induce an electric field in the crystal at right angles to the propagation direction of the optical energy through the crystal. Positioned between laser source 11 and one face of crystal 14 is a polarizing plate 17, having its polarization axis inclined at a 45° angle relative to the E-field established in crystal 14 by electrodes 15 and 16. Positioned between crystal 14 and receiver 12 is a further polarizing plate 18, having its polarization axis at right angles to that of plate 17. It can be shown that the ratio of the irradiance of optical energy transmitted through an electro-optical modulator 13 to the intensity of the optical energy incident on the modulator is directly proportional to the square of the voltage between electrodes 15 and 16, provided the voltage between the electrodes is much less than the voltage required for maximum transmission through crystal 14. Since the ratio of the amplitude of the transmitted optical E-field to the amplitude of the incident E-field is the square root of the ratio of the irradiance of the transmitted energy to the incident energy, the amplitude of the transmitted to incident E-field is directly proportional to the voltage applied between electrodes 15 and 16 of crystal 14.

To enable modulator 13 to be driven in accordance with any one of the four random, staitistical functions noted above (realizing that Equation (3) covers two cases, viz, $\mu = 0$ and $\mu \neq 0$, analog computer circuit 21 is provided and is responsive to an analog Gaussian source 22. Analog computer circuit 21 can be set to any one of four different configurations, depending upon the setting of knob 23 which activates certain switches within the computer circuit. In particular, knob 23 can be set to one of four positions corresponding with log normal, Rayleigh, Ricean, or beta statistics. The square root of the output signal of analog computer circuit 21 corresponding with the selected statistical distribution is applied, via square root device 19, between electrodes 15 and 16 of crystal 14 to establish random voltage variations across the crystal corresponding with the relationships given by Equations 1–3. To establish offset voltages included for the log normal and Ricean statistical functions, analog computer circuit 21 is provided with a pair of d.c. input voltages, as derived from potentiometers 24 and 25, having settings respectively determined by the Ricean and log normal offsets. Potentiometer 25 is connected between a positive d.c. source and ground because the log normal offset is always uni-polar, while potentiometer 24 is connected between positive and negative d.c. power supply voltages, because the Ricean offset may be positive or negative relative to a zero mean value, which describes the Rayleigh statistical variations.

Reference is now made to FIG. 2 of the drawing wherein there is illustrated a circuit diagram of a preferred embodiment of analog computer circuit 21, Gaussian source 22 and switches which enable Equations 1–3 to be implemented.

Analog computer circuit 21 is driven by a relatively wide band analog Gaussian, white noise random signal source 22, which in a preferred embodiment has a bandwidth from 0 to 15 KHz. Signal source 22 drives parallel circuitry for deriving a pair of independent, random, baseband analog signals having approximately a zero cross-correlation coefficient and the same bandwidth. Typically, the bandwidth is from 0 to 500 Hertz, and one of the random signals is derived by feeding source 22 directly to low pass filter 31, having a high frequency cutoff of 500 Hertz. The other 500 Hertz baseband random signal is derived by supplying the output of signal source 22 to bandpass filter 32, having a bandpass typically between 9 and 11 KHz. Filter 32 derives an output signal that is heterodyned with a carrier frequency of oscillator 33, having a frequency of 10 KHz. The heterodyning is performed in analog multiplier 34, which derives sum and difference frequencies having random components governed by the signal passed through filter 32. The difference or beat frequency derived from multiplier 34 is at baseband, and is passed through low pass filter 35, having a cutoff frequency equal to the cutoff frequency of filter 31, i.e., 500 Hertz.

The first and second random Gaussian signals derived from filters 31 and 35 are applied to the remainder of the circuitry in computer 21 to derive voltages enabling the four different types of perturbations to be simulated. For beta, Rayleigh or Ricean statistics, the output signals of filters 31 and 35 are respectively applied to variable gain, operational d.c. amplifiers 36 and 37, having gain settings adjusted so that the desired maximum range of voltages is applied between electrodes 15 and 16 of crystal 14. The signal derived from filter 35 is coupled to the input of amplifier 37 via switch 38, the position of which is controlled by knob 23. The output signal of filter 31 is selectively combined with the Ricean offset derived from potentiometer 24 when switch 39 is activated to a closed state in response to knob 23 being positioned for selection of the Ricean statistics. Thereby, the output signal of low pass filter 31 is selectively added to the Ricean offset determined by the setting of potentiometer 24 in variable gain amplifier 36.

The output signals of amplifiers 36 and 37 are selectively applied to analog squaring modules 41 and 42 which derive positive d.c. analog output signals having magnitudes proportional to the square of the input voltages thereof. In preferred embodiments, the squaring modules may be of the type obtainable from Burr Brown, Model 9874/19 or Model 4096/15.

The output signals derived from squaring modules 41 and 42 are applied as input signals to analog, operational summing amplifier 43 which derives a negative voltage, output signal having a magnitude proportional to the sum of its two input signals. The negative output voltage of summing amplifier 43 is reversed in polarity to a positive voltage by inverting operational amplifier 44. Amplifier 44 derives an output signal having a magnitude representing a chi-squared function enabling Rayleigh or Ricean amplitude modulation of the optical energy E-field incident on modulator 13 to be obtained. To this end, the output signal of amplifier 44 is applied through switch 45 to square root device 19, with knob 23 activated when one of the Ricean or Rayleigh statistics is selected.

For the beta statistics being selected by knob 23, switch 45 is not connected to the output of inverting amplifier 44. Instead, the output of amplifier 44 is coupled through switch 46 to an input of antilog converter 47. Switch 46 is controlled by the position of knob 23 so that the output of amplifier 44 drives the input of converter 47 only when the knob is adjusted to select the beta statistics. For selection of the log normal statistics, knob 23 activates switch 46 so that the output of amplifier 44 is decoupled from switch 45 and square root device 19.

In the log normal configuration, switch 38 is activated so that the output of low pass filter 35 is coupled to an input of operational summing amplifier 48. A further input to amplifier 48 is derived from log normal offset potentiometer 25. The output signal of amplifier 48 is selectively coupled through switch 46 to the input of antilog converter 47 when knob 23 is adjusted to select the log normal statistics.

Antilog converter 47 responds to its input, whether from the chi-squared voltage output of amplifier 48, to transform the input voltage thereof into an output voltage having a magnitude porportional to the base of natural logarithms (e) raised to a power proportional to the value of the input voltage. Thereby, the output voltage of antilog converter 47 is represented as:

$e^A$, where A is proportional to the magnitude of the input voltage to the antilog converter.

In one embodiment, antilog converter 47 may be a logarithmic amplifier connected in the feedback loop of a high gain amplifier. Such a unit is available as Burr Brown, Model 4116.

The output signal of antilog converter 47 is selectively applied through switch 51 to an input of operational scaling amplifier 52. Switch 51 is controlled by the position of knob 23 so that for the log normal statistics, the output of the converter 47 is applied to the input of amplifier 52, the gain of which is adjusted to enable the desired maximum range of output voltages to be applied between electrodes 15 and 16 of crystal 14. In the log normal mode, the output signal of scaling amplifier 52 is applied through switch 53 to a further, fixed gain operational amplifier 54. For the beta statistics, switches 51 and 53 are activated by knob 23 so that scaling amplifier 52 is bypassed, whereby the output signal of antilog converter 47 is applied directly to the input of amplifier 54. The output signal of amplifier 54 represents either the beta or log normal statistics and is applied between electrodes 15 and 16 via switch 45 in response to knob 23 being positioned to select either the log normal or beta statistics.

The circuit of FIG. 2 applies voltage variations between electrodes 15 and 16 in accordance with Equations 1–3. For the beta statistics, switches 38, 46, 51, and 53 are adjusted so that the output voltage of amplifier 54, as coupled through switch 45, is:

$$I_M = C10e^{-((1/10/5)(X^2_{TP2} + X^2_{TP5})/20)} \qquad (4)$$

where:

$X_{TP2}$ and $X_{TP5}$ are zero, mean, equal variance, Gaussian random signals derived from low pass filters 31 and 35.

Since $\rho^2$ in Equation (1) is a chi-squared random variable of two degrees of freedom corresponding to two independent orthogonal Gaussian tracking error signals, Equation (4) is an accurate simulation of Equation (1).

To simulate the log normal statistics given by Equation (2), switches 38, 46, 51, and 53 are activated to cause the output signal of filter 13 to be combined with the log normal offset of potentiometer 25, with the resultant combined signal being supplied to antilog converter 47 which drives amplifier 52 to provide an output signal at switch 45 that corresponds with a modulated irradiance:

$$I_M = \frac{b}{10} e^{-2} (X_{TP7} + A) \ln 10/10 \qquad (5)$$

The voltages derived from amplifier 54 represented by Equations (4) and (5) are transformed into irradiance modulations of the optical energy passing through modulator 13 by the direct proportionality constant, C. Thereby, Equation (4) can be transformed into an equation having the same form as Equation (1) by redefining:
$I_0 = 10C$
$\sigma^2$ = variance $[X_{TP2}]$ = variance $[X_{TP5}]$
$\epsilon^2 = 50/\ln 10$
and
$\rho^2 = X^2_{TP2} + X^2_{TP5}$.

Thereby Equation (1) is satisfied and the probability density of the modulated optical energy can be written as:

$$f_{I_M}(i_M) = \frac{\xi^2}{\sigma^2} \left(\frac{1}{I_0}\right)^{\xi^2/\sigma^2} (i_M)^{\xi^2/\sigma^2 - 1} \qquad 0 \leq i_M \leq I_0.$$

The ratio of $\epsilon/\sigma$ is determined by the transmission link being simulated and varies typically from 3 to 10.

Equation (5) is transformed by the modulation process of modulator 13 into Equation (2) by redefining the variables in Equation (5) so that $$I_0 = \frac{bC}{10}$$

and $$L = - (X_{TP7} + A) \frac{\ln 10}{10}.$$

The log amplitude has a mean value equal to the negative value of its variance $s^2$. Therefore, letting
$E\{L\} = -Var\{L\} = -s^2$,
relationships for the values of A and $\sigma^2 X_{TP7}$ with $s^2$ are established as:
$A = s^2 \, 10/\ln 10$,
and
$\sigma^2_{X_{TP7}} = s^2 [10/\ln 10]^2$.

The value of $s^2$ is selected from atmospheric scintillation data and ranges nominally from $s^2 = 0.01$ to $s^2 = 0.1$.

For the Rayleigh and Ricean statistics, the output signal of amplifier 44 drives the square root device 19, the output of which drives electrodes 15 and 16 of crystal 14 to simulate the amplitude ratio of Equation (3) in accordance with:

$$P = \left[ C \left\{ \frac{(X_{TP2} + d)^2}{20} + \frac{X_{TP5}^2}{20} \right\} \right]^{1/2} \qquad (6).$$

The square root function introduced by Equation (6) is obtained since the Ricean and Rayleigh statistics are related to the amplitude, rather than irradiance, of the optical beam derived from modulator 13.

While there has been described and illustrated one specific embodiment of the invention, it will be clear that variations in the details of the embodiment specifically illustrated and described may be made without departing from the true spirit and scope of the invention as defined in the appended claims. For example, the analog computer circuit 21 and analog Gaussian source 22 could be replaced by equivalent digital computer circuitry that drives a digital to analog converter which is connected between electrodes 15 and 16 of crystal 14, although the analog computer circuitry is believed more advantageous, from an economic and flexibility standpoint than a digital computer approach.

What is claimed is:

1. Apparatus for simulating a space-to-space or space-to-earth optical transmission link comprising a Gaussian random source, a computer responsive to the Gaussian random source for deriving an analog signal having random variations indicative of characteristics of the transmission link, and a linear optical modulator connected to be responsive to the analog signal and adapted to be positioned between an optical carrier source and a receiver for the carrier of the source, whereby light transmitted through the modulator is modulated in accordance with the random variations of the analog signal.

2. The apparatus of claim 1 wherein the Gaussian source includes means for deriving first and second random Gaussian signals having a substantially zero cross-correlation coefficient, said computer including: means responsive to the first and second signals for deriving a third signal having a magnitude commensurate with the value of the sum of the squares of the first and second signals, and means responsive to the third signal for deriving the analog signal as a function of the third signal.

3. The apparatus of claim 2 wherein the means for deriving the third signal includes antilog converter means responsive to the third signal for deriving the analog signal as a beta output for modulating the optical energy coupled through the modulator to simulate a space-to-space optical transmission link having pointing errors imposed thereon.

4. The apparatus of claim 2 wherein the deriving means includes means for applying a replica of variations of the third signal to the modulator as a chi-squared output for amplitude modulating the light coupled through the modulator to simulate a space-to-earth optical transmission link having atmospheric perturbations.

5. The apparatus of claim 4 further including means for selectively offsetting one of the Gaussian random signals, whereby the chi-squared output respectively simulates Ricean and Rayleigh modulation while the offset is and is not imposed on the one Gaussian signal.

6. The apparatus of claim 2 wherein the means for deriving the first and second Gaussian signals includes an analog Gaussian signal source having at least a first predetermined bandwidth, bandpass filter means responsive to only a first segment of th bandwidth of the analog Gaussian source for deriving the first signal as an additional analog signal having a second predetermined bandwidth less than the first bandwidth, and heterodyne means responsive to only a second segment of the bandwidth of the analog Gaussian source for deriving the second signal as a further analog signal having the same bandwidth as the bandwidth of the additional analog signal.

7. The apparatus of claim 6 wherein the means for deriving the additional signal includes low pass filter means for deriving the additional signal as a baseband signal, and the means for deriving the further signal includes low pass filter means responsive to a beat frequency of the heterodyne means for deriving the further signal as a baseband signal.

8. The apparatus of claim 1 wherein the computer includes antilog converter means for deriving the analog signal as a function of the antilog of variations of the Gaussian source.

9. The apparatus of claim 8 wherein the computer includes means for offsetting the variations of the Gaussian source, and means for coupling the offset variations to the antilog converter means, and means for coupling a replica of variations of the antilog converter to the modulator as the analog signal to modulate optical energy coupled through the modulator, whereby the irradiance output of the modulator simulates log normal characteristics of a space-to-earth transmission link due to atmospheric perturbations.

10. The apparatus of claim 1 wherein Rayleigh amplitude modulation can be simulated, said Gaussian random source includes a means for deriving first and second analog signals having a substantially zero cross correlation coefficient, and said computer is responsive to the first and second analog signals for deriving an analog signal having variations proportional to Rayleigh amplitude modulation.

11. The apparatus of claim 1 wherein Ricean amplitude modulation can be simulated, said Gaussian random source includes a means for deriving first and second analog signals having a substantially zero cross correlation coefficient, and said computer is responsive to the first and second analog signals for deriving an analog signal having variations proportional to Ricean amplitude modulation.

12. The apparatus of claim 1 where beta irradiance modulation can be simulated, said Gaussian random source includes a means for deriving first and second analog signals having a substantially zero cross correlation coefficient, and said computer is responsive to the first and second analog signals for deriving an analog signal having variations proportional to beta irradiance modulation.

13. The apparatus of claim 1 wherein log normal irradiance modulation can be simulated, said Gaussian random source includes a means for deriving first and second analog signals having a substantially zero cross correlation coefficient and said computer is responsive to the first and second analog signals for deriving an analog signal having varations proportional to log normal irradiance modulation.

* * * * *